US010976216B2

(12) United States Patent
Geist

(10) Patent No.: US 10,976,216 B2
(45) Date of Patent: Apr. 13, 2021

(54) VEHICLE TEST APPARATUS

(71) Applicant: GM GLOBAL TECHNOLOGY OPERATIONS LLC, Detroit, MI (US)

(72) Inventor: Michael Geist, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 16/552,844

(22) Filed: Aug. 27, 2019

(65) Prior Publication Data

US 2021/0063272 A1 Mar. 4, 2021

(51) Int. Cl.
*G01M 7/02* (2006.01)
(52) U.S. Cl.
CPC .................................. *G01M 7/027* (2013.01)
(58) Field of Classification Search
CPC .......... G01M 7/027; G01M 7/02; G01M 7/06; G01M 7/08
See application file for complete search history.

(56) References Cited

U.S. PATENT DOCUMENTS

| | | | | | |
|---|---|---|---|---|---|
| 3,555,893 | A | * | 1/1971 | Holzman | G01M 17/06 73/669 |
| 5,375,464 | A | * | 12/1994 | Dadt | G01M 17/0074 180/198 |
| 5,610,330 | A | * | 3/1997 | Fricke | G01M 7/022 73/146 |
| 8,966,987 | B2 | * | 3/2015 | Clusserath | G01M 17/0074 73/669 |

\* cited by examiner

*Primary Examiner* — Suman K Nath
(74) *Attorney, Agent, or Firm* — Cantor Colburn LLP

(57) ABSTRACT

A vehicle test apparatus is provided. The vehicle test apparatus may include a pair of support members and a pair of lateral translation assemblies. Each support member defines a central axis. Each assembly of the pair of lateral translation assemblies may be mounted to an upper end of one of the pair of support members. Each assembly of the pair of lateral translation assemblies may include a front wheelpan mounted to one of the pair of support members for lateral movement relative to a respective central axis. Each assembly of the pair of lateral translation assemblies may further include a hydraulic cylinder arranged with a respective front wheelpan to direct lateral movement thereof.

19 Claims, 3 Drawing Sheets

VEHICLE TEST APPARATUS

INTRODUCTION

The subject disclosure relates to a vehicle test apparatus to simulate loads experienced by a vehicle during vehicle movement.

A shaker rig is one example of the vehicle test apparatus. Operation of current shaker rigs may generate data that is negatively impacted by suspension bind-up created during the vehicle movement. As such, a shaker rig design that reduces and controls the effects of the suspension bind-up is desired.

SUMMARY

In one exemplary embodiment, a vehicle test apparatus is provided. The vehicle test apparatus includes a pair of support members and a pair of lateral translation assemblies. Each support member defines a central axis. Each assembly of the pair of lateral translation assemblies is mounted to an upper end of one of the pair of support members. Each assembly of the pair of lateral translation assemblies includes a front wheelpan mounted to one of the pair of support members for lateral movement relative to a respective central axis. Each assembly of the pair of lateral translation assemblies further includes a hydraulic cylinder arranged with a respective front wheelpan to direct lateral movement thereof. Each of the hydraulic cylinders outputs a force in a lateral direction relative to the respective central axis responsive to receipt of a signal indicating lateral movement of a wheel of a pair of front wheels of a vehicle. Each wheel is positioned upon one of the front wheelpans. An amount of each of the outputted forces is selected to influence lateral movement of each wheel via a respective front wheelpan.

In addition to one or more of the features described herein, each of the hydraulic cylinders may be interconnected with one another such that lateral movement of a respective wheel of the pair of front wheels is decoupled from lateral movement of the vehicle including the pair of front wheels.

In addition to one or more of the features described herein, the vehicle test apparatus may further include a sensor mounted upon one of the front wheelpans and in electrical communication with each hydraulic cylinder to output a sensor signal relating to detected lateral movement of one of the wheels of the pair of front wheels each positioned upon one of the front wheelpans. Each of the hydraulic cylinders may output a force in a lateral direction, relative to the respective central axis, responsive to receipt of the sensor signal regarding lateral movement of a respective wheel.

In addition to one or more of the features described herein, the vehicle test apparatus may further include a hydraulic line to facilitate fluid communication between hydraulic cylinders of one of the pair of lateral translation assemblies and hydraulic cylinders of the other of the pair of lateral translation assemblies. The vehicle test apparatus may further include a control valve operatively connected to the hydraulic line, in electrical communication with the sensor, and programmed to open responsive to receiving a signal from the sensor indicating detected lateral movement of one of the wheels of the pair of front wheels.

In addition to one or more of the features described herein, the sensor may be mounted to one of the front wheelpans such that the sensor may detect lateral movement of one of the wheels of the pair of front wheels positioned in a predetermined region of one of the front wheelpans.

In addition to one or more of the features described herein, each assembly of the pair of lateral translation assemblies may further include one or more retainers. Each retainer of the one or more retainers may be mounted to on of the front wheelpans to retain one wheel of the pair of front wheels within a predetermined region while permitting rotation of the one wheel.

In addition to one or more of the features described herein, each of the hydraulic cylinders may include a first chamber and a second chamber. Each of the first chambers may be in fluid communication with one another and each of the second chambers may be in fluid communication with one another. These fluid communications may facilitate an interconnected relationship between the hydraulic cylinders.

In accordance with another exemplary embodiment, a shaker rig for a vehicle is provided. The shaker rig includes a pair of front support member, a pair of front translation assemblies, a pair of rear support members, and a pair of rear translation assemblies. The pair of front support members supports a front portion of a vehicle thereupon. Each of the front translation assemblies is mounted to one of the pair of front support members. Each of the front translation assemblies includes a front wheelpan mounted for a first lateral movement. Each of the front translation assemblies further includes a first hydraulic cylinder to direct the first lateral movement. The pair of rear support members is arranged with the pair of front support members to support a rear portion of the vehicle thereupon. The vehicle defines a longitudinal axis oriented substantially perpendicular to a lateral axis defined by one of the front wheelpans. Each of the rear translation assemblies is mounted to one of the pair of rear support members. Each of the rear translation assemblies includes a rear wheelpan mounted for a second lateral movement. Each of the rear translation assemblies further includes a second hydraulic cylinder to direct the second lateral movement. The front wheelpans and the rear wheelpans are each arranged with a respective translation assembly to facilitate lateral movement of a respective wheelpan such that lateral movement of wheels of the vehicle resting upon the respective wheelpan is decoupled from movement of the vehicle.

In addition to one or more of the features described herein, the shaker rig may further include a sensor, a first hydraulic line, and a first control valve. The sensor may be mounted to one of the front wheelpans or one of the rear wheelpans. The first hydraulic line may fluidly connect each of the first hydraulic cylinders to one another. The first control valve may be operatively connected to the first hydraulic line an in electrical communication with the sensor. The first control valve may open responsive to receipt of a signal from the sensor indicating a lateral movement of the wheel such that each of the first hydraulic cylinders outputs a fluid force in an amount selected to substantially maintain positions of the wheelpans relative to the longitudinal axis of the vehicle.

In addition to one or more of the features described herein, the shaker rig may further include a second hydraulic line and a second control valve. The second hydraulic line may fluidly connect the second hydraulic cylinders to one another. The second control valve may operatively connect to the second hydraulic line and may be in electrical communication with the sensor. The second hydraulic line and the second control valve may be arranged with one another to interconnect the second hydraulic cylinders such that each of the wheelpans influence lateral movement of each of the wheels resting thereupon independent of movement of the vehicle.

In addition to one or more of the features described herein, one of the first control valve and the second control valve may be an active valve programmed to facilitate real-time control of fluid flow as directed by the hydraulic cylinders.

In addition to one or more of the features described herein, one of the first control valve and the second control valve may be accessible by a user for manual input.

In addition to one or more of the features described herein, the shaker rig may further include a sensor mounted to one of the front wheelpans or one of the rear wheelpans at a location adjacent a region that receives a portion of one of the wheels of the vehicle.

In addition to one or more of the features described herein, each of the front translation assemblies and each of the rear translation assemblies may further include one or more retainers. Each retainer of the one or more retainers may be mounted to one of the wheelpans to retain a respective wheel within a predetermined region while permitting rotation of the respective wheel.

In accordance with yet another exemplary embodiment, a lateral translation assembly for a vehicle test apparatus is provided. The lateral translation assembly includes a pair of front support shafts, a pair of wheelpans, a sensor, and a pair of mechanisms. Each wheelpan of the pair of wheelpans is mounted to one support shaft of the pair of front support shafts to support a front wheel of a vehicle. The sensor is mounted to one wheelpan of the pair of wheelpans to detect lateral movement of the front wheel. Each mechanism of the pair of mechanisms is arranged to direct lateral movement of a respective wheelpan based on a signal received from the sensor indicating the lateral movement of the front wheel is influencing a bind-up scenario for a vehicle suspension assembly operatively connected to the front wheel.

In addition to one or more of the features described herein, each mechanism of the pair of mechanisms may include a hydraulic cylinder. Each of the hydraulic cylinders may be arranged with one another to facilitate an interconnecting relationship therebetween such that lateral movement of the front wheel is independent of movement of a vehicle including the front wheel.

In addition to one or more of the features described herein, the lateral translation assembly may further include a pair of rear support shafts, a pair of second wheelpans, and a pair of second mechanisms. Each wheelpan of the pair of second wheelpans may be mounted to one support shaft of the pair of rear support shafts to support a rear wheel. Each mechanism of the pair of second mechanisms may be arranged to direct lateral movement of a respective wheelpan based on a second signal received from the sensor. Each mechanism of the pair of mechanisms and each mechanism of the pair of second mechanisms may include a hydraulic cylinder. Two of the hydraulic cylinders may be interconnected with one another to facilitate an interconnecting relationship such that lateral movement of the rear wheel is independent of movement of a vehicle including the rear wheel.

In addition to one or more of the features described herein, the lateral translation assembly may further include a first hydraulic line and a control valve. The first hydraulic line may facilitate a first fluid communication between the hydraulic cylinder mounted to one of the wheelpans and the hydraulic cylinder mounted to the other of the wheelpans. The control valve may be operatively connected to the first hydraulic line such that when in a first position synchronous movement of the wheels resting upon respective wheelpans is prevented.

In addition to one or more of the features described herein, the control valve may be an active valve programmed to facilitate real-time control of fluid flow as directed by the cylinders.

In addition to one or more of the features described herein, the control valve may be accessible by a user to manually adjust the control valve.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application, or uses.

Figure 1:
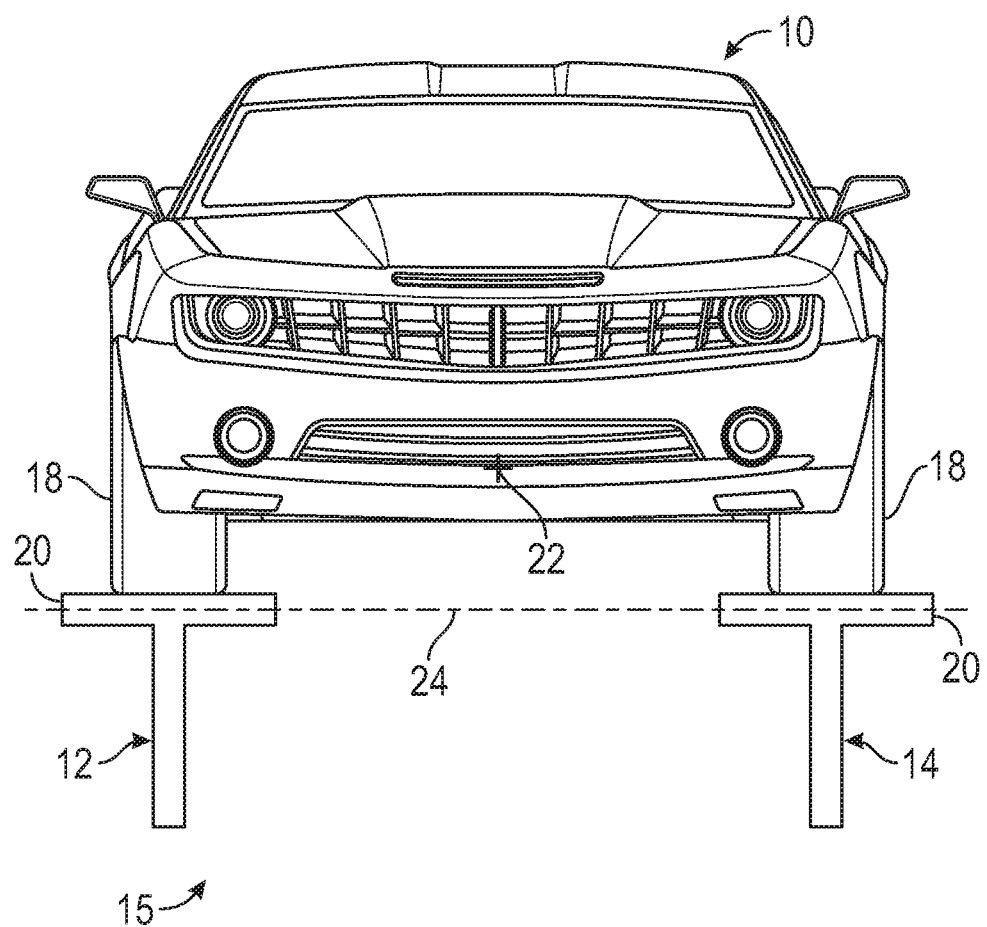
FIG. 1 is an illustrative front view of a vehicle shown on an example of a portion of a shaker rig.

FIG. 1 illustrates a front view of an example of a vehicle 10 resting upon a first shaft 12 and a second shaft 14. Each wheel 18 of a pair of front wheels may rest upon a respective wheelpan 20 of each of the first shaft 12 and the second shaft 14. Each of the wheelpans 20 may include a low friction surface, such as a low friction plastic top surface. The vehicle 10 defines a longitudinal axis 22. The wheelpans 20 define a lateral axis 24.

The first shaft 12, the second shaft 14, and the wheelpans 20 are part of a shaker rig test apparatus 15. The shaker rig test apparatus 15 may be used to quantify noise and vibration outputs and ride and handling parameters of the vehicle 10 based on vehicle movement. While the low friction surface of each wheelpan 20 may allow some lateral movement of each wheel 18 of the pair of front wheels, each of the wheelpans 20 restricts lateral movement of each wheel 18 which may cause bind-up of a suspension of the vehicle 10. The bind-up may be due to the wheelpans 20 being rigidly mounted to a respective shaft 12, 14 thus restricting the lateral movement of each wheel 18 in a direction parallel to the lateral axis 24. This bind-up of the suspension may cause unrealistic tire contact patch forces and degrade a fidelity of data obtained during testing of the vehicle 10 on the shaker rig test apparatus 15.

In one example, the shaker rig test apparatus 15 shown in FIG. 1 is used in motorsport environments in which vehicles typically have independent suspensions with low roll centers, high suspension rates, and minimal suspension travel that all assist in minimizing lateral wheel movement. This usage is consistent with real-world tire contact patch forces and may provide useful data. Conversely, typical passenger vehicles exhibit large lateral tire movement throughout suspension travel. This can cause unrealistic tire contact patch forces and may produce low fidelity data when a vehicle is tested on the shaker rig test apparatus 15.

Figure 2:
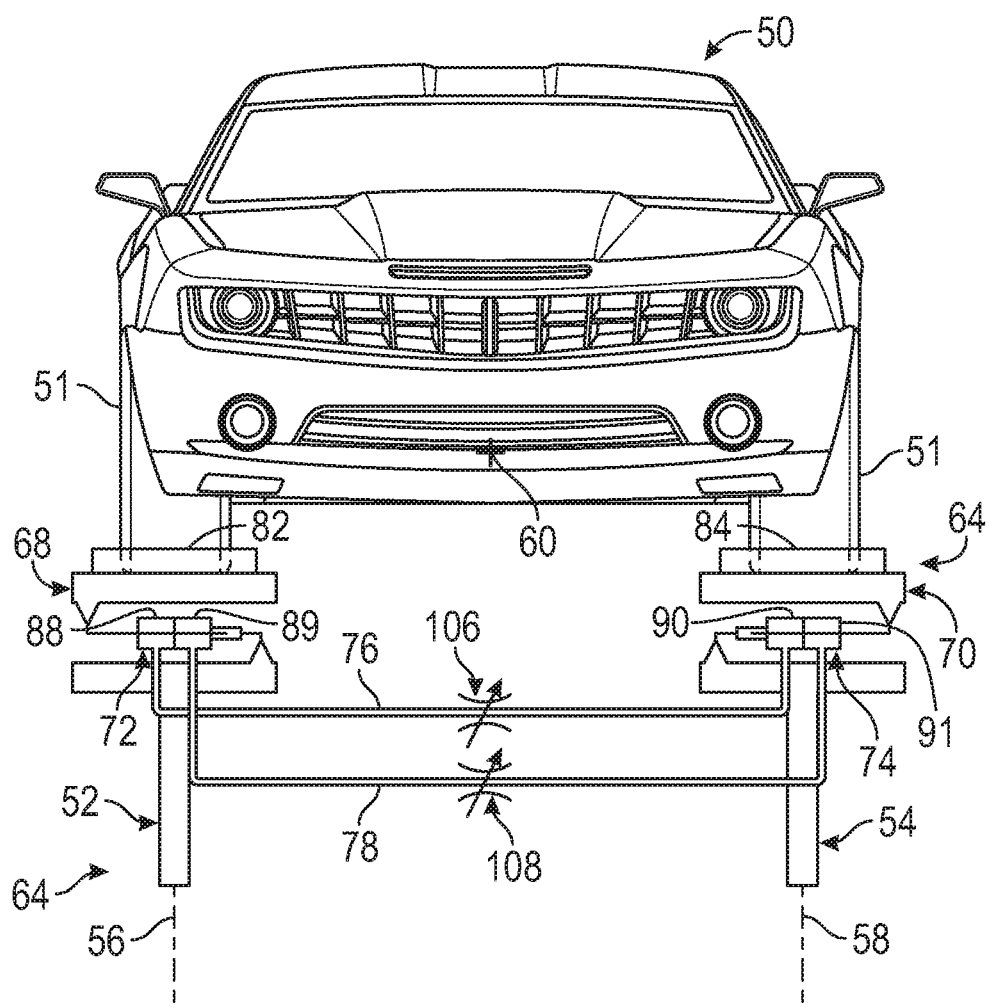
FIG. 2 is an illustrative front view of another vehicle shown on another example of a shaker rig.

In accordance with an exemplary embodiment, FIG. 2 is an illustrative front view of another example of a vehicle 50 shown resting upon a first support member 52 and a second support member 54. The vehicle 50 may include a pair of front wheels 51. The first support member 52 may define a first central axis 56 and the second support member 54 may define a second central axis 58. Each of the first support member 52 and the second support member 54 may be arranged such that each of the first central axis 56 and the second central axis 58 is oriented vertically relative to a longitudinal axis 60 defined by the vehicle 50. At least a portion of each of the first support member 52 and the second support member 54 may be vertically translatable in directions substantially parallel to the first central axis 56 and the second central axis 58.

Each of the first support member 52 and the second support member 54 may be a part of a shaker rig test apparatus 64. While FIG. 2 illustrates two support members for supporting two vehicle wheels, those skilled in the art will appreciate that the shaker rig test apparatus 64 may include various numbers of support shafts having translation assemblies to accommodate various axle configurations of vehicles. The shaker rig test apparatus 64 may operate to identify vehicle noise, vibration, and harshness (also commonly referred to as "NVH.") outputs and to identify whether ride and handling parameters are met. The shaker rig test apparatus 64 may identify these parameters while permitting lateral movement of each of the pair of front wheels 51 to minimize bind-up due to vertical movement (relative to an underlying surface) of a suspension (not shown) of the vehicle 50. This minimization of suspension bind-up leads to improved test data in comparison to data obtained from previous shaker rigs, such as the shaker rig test apparatus 15 shown in FIG. 1.

The shaker rig test apparatus 64 may include components such as a first wheelpan 68, a second wheelpan 70, a first lateral movement assembly 72, a second lateral movement assembly 74, a first hydraulic line 76, and a second hydraulic line 78. In FIG. 2, the components of the shaker rig test apparatus 64 are shown schematically oriented with one another for clarity, however one skilled in the art will understand that FIG. 2 is illustrative and will understand that various configurations are available to assemble the components of the shaker rig test apparatus 64 with one another.

The first wheelpan 68 may be mounted to the first support member 52 and the second wheelpan 70 may be mounted to the second support member 54. The first lateral movement assembly 72 may include a first mechanism arranged with the first wheelpan 68 and the first support member 52 to direct lateral movement of the first wheelpan 68 relative to the longitudinal axis 60. The second lateral movement assembly 74 may include a second mechanism arranged with the second wheelpan 70 and the second support member 54 to direct lateral movement of the second wheelpan 70 relative to the longitudinal axis 60. Lateral movement of the first wheelpan 68 and the second wheelpan 70 may be facilitated by a respective mechanism including, for example, one or more laterally sliding bearings such as a linear ball bearing, a roller bearing, a plain bearing, an air bearing, a liquid bearing, or an electromagnet bearing. Hydraulic cylinders may also be used to assist in facilitating the lateral movement of the first wheelpan 68 and the second wheelpan 70.

Each of the first wheelpan 68 and the second wheelpan 70 may be structured to retain one of the wheels of the pair of front wheels 51 upon a respective wheelpan while permitting the wheel to move laterally relative to the longitudinal axis 60. While the shaker rig test apparatus 64 is structured to test a vehicle statically resting upon the support members, it is also contemplated that the first wheelpan 68 and the second wheelpan 70 may be structured to retain a wheel of the pair of front wheels 51 upon a respective wheelpan while also permitting the wheel to rotate.

The lateral movement may be respectively directed by one of the first lateral movement assembly 72 and/or the second lateral movement assembly 74. For example, the first lateral movement assembly 72 and the second lateral movement assembly 74 may be arranged with one another to prevent synchronous lateral movement of the pair of front wheels 51 while permitting separate lateral movement of the pair of front wheels 51 in directions opposite one another.

In another example, the first wheelpan 68 may include a first retainer 82 and the second wheelpan 70 may include a second retainer 84. Each of the first retainer 82 and the second retainer 84 may include one or more elements, such as roller elements, to facilitate rotation of a respective wheel while preventing travel of the vehicle 50 in a direction parallel to the longitudinal axis 60.

Figure 3:
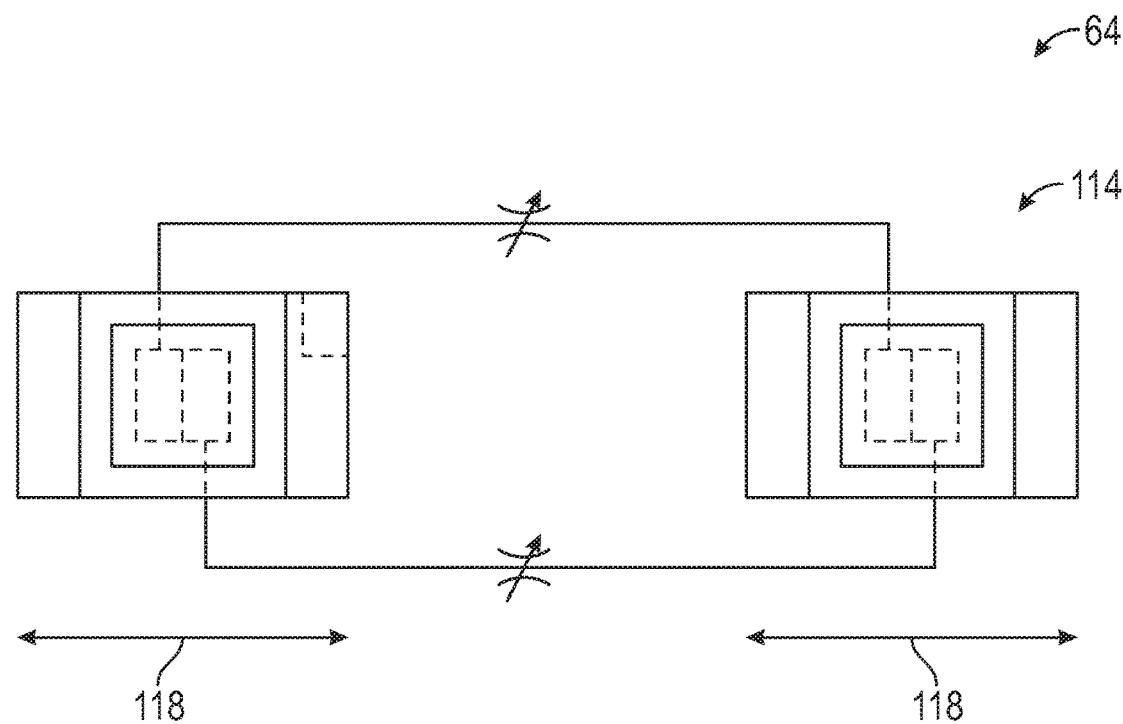
FIG. 3 is a top plan view of a portion of the shaker rig of FIG. 2.
Figure 3:
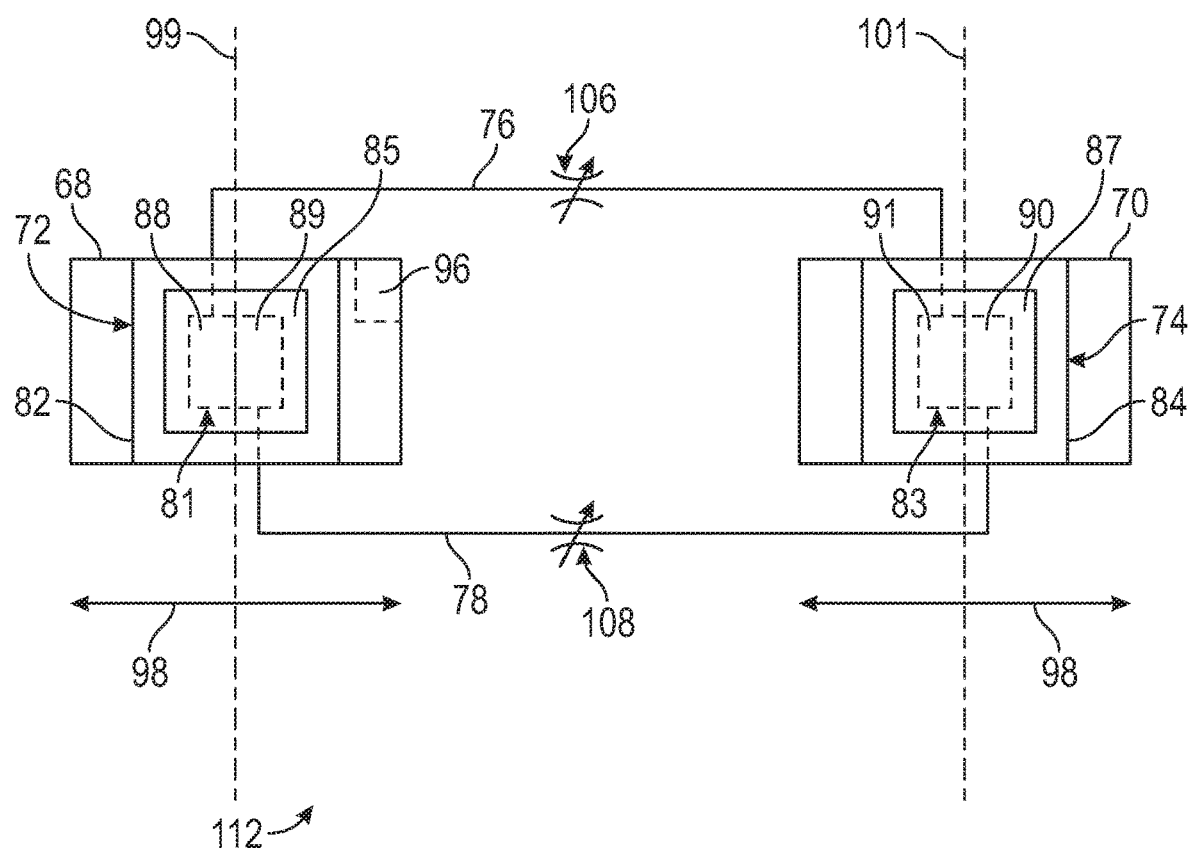

Now additionally referring to FIG. 3, it is contemplated that each respective wheelpan may include a surface or region with a low coefficient of friction to assist in facilitating lateral wheel movement. For example, the first retainer 82 may define a first region 85 and the second retainer 84 may define a second region 87. Each of the first region 85 and the second region 87 may be sized for positioning a portion of one wheel of the pair of front wheels 51 thereupon. Alternatively, it is contemplated that each respective region is sized to include a belt or similar component to assist in facilitating wheel rotation.

Each of the first lateral movement assembly 72 and the second lateral movement assembly 74 may include components to direct lateral movement of respective wheelpans relative to the longitudinal axis 60 shown in FIG. 2 to assist in compensating for suspension bind-up scenarios. In one example, the first lateral movement assembly 72 may include a first hydraulic cylinder 81 and the second lateral movement assembly 74 may include a second hydraulic cylinder 83. Each of the first hydraulic cylinder 81 and the second hydraulic cylinder 83 may be, for example, a double acting hydraulic cylinder with a through-rod.

The first hydraulic cylinder 81 and the second hydraulic cylinder 83 may be arranged with one another to direct movement of the wheelpans based on lateral movement of one of the wheels of the pair of wheels 51. To assist in directing the movement, the first hydraulic cylinder 81 may include a first chamber 88 and a second chamber 89 and the second hydraulic cylinder 83 may include a third chamber 90 and a fourth chamber 91. The first chamber 88 may be in fluid communication with the fourth chamber 91 via the first hydraulic line 76 and the second chamber 89 may be in fluid communication with the third chamber 90 via the second hydraulic line 78. The fluid communication between the chambers may be such that each of the chambers outputs fluid to influence movement of each wheel of the pair of front wheels 51 in a direction opposite one another to compensate for suspension bind-up scenarios.

In one example, the first hydraulic cylinder 81 and the second hydraulic cylinder 83 may be arranged with one another in an interconnected relationship. The interconnected relationship may be defined herein as a relationship in which the chambers are in fluid communication with one another such that operation of respective lateral movement assemblies allows for each wheel of the front pair of wheels 51 to move laterally while retaining a position of the vehicle 50 in substantially the same place. In other words, lateral movement of a respective wheel is decoupled from lateral movement of a vehicle including the respective wheel.

A sensor 96 may be disposed on one of the wheelpans and/or at a location adjacent one of the wheels resting upon a respective wheelpan, such as the wheelpan 68, to detect lateral movement of the wheel. The sensor 96 may then output a signal indicating detection of lateral movement of the wheel to the first hydraulic cylinder 81 and the second hydraulic cylinder 83. Responsive thereto, the first hydraulic cylinder 81 and the second hydraulic cylinder 83 may activate to influence lateral movement of a respective wheelpan as represented by arrows 98 shown in FIG. 3. In one example, the cylinders may be arranged with one another such that movement of a respective wheel is independent of movement of the vehicle 50. Alternatively, the sensor 96 may be capable of indicating whether the lateral movement of the wheel is influencing a bind-up scenario for a suspension assembly operatively connected to the wheel.

The first hydraulic cylinder 81 and the second hydraulic cylinder 83 may operate as lateral dampers as related to wheel movement. The lateral movement of the respective wheelpan may be in a direction substantially perpendicular to a first wheelpan axis 99 defined by the first wheelpan 68 and a second wheelpan axis 101 defined by the second wheelpan 70.

For example, each of the chambers of the first hydraulic cylinder 81 may be in fluid communication with one of the chambers of the second hydraulic cylinder 83 via the first hydraulic line 76 and the second hydraulic line 78. Each of the first hydraulic line 76 and the second hydraulic line 78 may be structured for fluid to flow therethrough. Additionally, the first hydraulic line 76 may include a first control valve 106 and the second hydraulic line 78 may include a second control valve 108 to assist in dampening lateral movement of a respective wheel via wheelpan movement.

Each of the first control valve 106 and the second control valve 108 may operate to control a fluid flow within a respective hydraulic line such that the fluid flow influences lateral movement of each of the front pair of wheels 51. Non-limiting examples of the first control valve 106 and the second control valve 108 include a gate valve, a needle valve, and a ball valve.

As mentioned above, the first hydraulic cylinder 81 and the second hydraulic cylinder 83 may be interconnected with one another such that lateral movement of a respective wheel of the pair of front wheels 51 is decoupled from lateral movement of the vehicle 50. Further, components of the shaker rig test apparatus 64 may be arranged in a passive format or an active format.

In a passive format, each of the first control valve 106 and the second control valve 108 may be arranged for manual access by a user such that the user may manually adjust each valve based on desired test scenarios. In an active format, each of the first control valve 106 and the second control valve 108 may be in electrical communication with a sensor, such as the sensor 96 described above, and include programming to open and close based on programming to maintain the interconnected relationship between the hydraulic cylinders. In one example, the first control valve 106 may open responsive to receipt of a signal from the sensor 96 indicating a lateral movement of a wheel such that each of the hydraulic cylinders 81, 83 outputs a fluid force in an amount selected to substantially maintain positions of the wheelpans relative to the longitudinal axis 60.

It is also contemplated that one of the control valves may be an active valve programmed to facilitate real-time control of fluid flow as directed by a respective cylinder. Additionally, the first control valve 106 and/or the second control valve 108 may be accessible by a user for manual input. Each of the hydraulic cylinders 81, 83 may be interconnected with one another such that lateral movement of a respective wheel is decoupled from lateral movement of the vehicle 50 including the respective wheels of the pair of front wheels 51.

It is contemplated that the shaker rig test apparatus 64 may include components to support rear wheels of a vehicle. As shown in FIG. 3, the shaker rig test apparatus 64 may include a front assembly 112 and a rear assembly 114. The front assembly 112 may include the components as identified in relation to a respective lateral movement assembly of FIG. 2 and FIG. 3. The rear assembly 114 may include components similar to the components of the front assembly 112 already described. The components of the rear assembly 114 may be arranged with one another to assist in managing lateral movement of rear wheels of a vehicle resting thereupon, such as rear wheels of the vehicle 50. Lateral movement of wheelpans of the rear assembly 114 is represented by arrows 118 of FIG. 3.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle test apparatus comprising:
   a pair of support members, each support member of the pair of support members defining a central axis;
   a pair of lateral movement assemblies, each lateral movement assembly of the pair of lateral movement assemblies mounted to an upper end of a respective one of the pair of support members, each lateral movement assembly including a front wheelpan mounted to a respective support member of the pair of support members for lateral movement relative to a respective central axis, each lateral movement assembly of the pair of lateral movement assemblies further including a hydraulic cylinder being arranged with the respective front wheelpan to direct the lateral movement thereof, and engaged between the respective front wheelpan and a respective one of the pair of support members; and
   a sensor mounted upon one of the front wheelpans and in electrical communication with each hydraulic cylinder to output a sensor signal relating to detected lateral movement of one of the wheels of the pair of front wheels each positioned upon a respective one of the front wheelpans, wherein each hydraulic cylinder outputs a force in a lateral direction, relative to the respective central axis, and responsive to receipt of the sensor signal regarding lateral movement of a respective wheel,
   wherein the hydraulic cylinder of each one of the lateral movement assemblies outputs a force in a lateral direction relative to the respective central axis responsive to receipt of the sensor signal indicating lateral movement of a respective wheel of a pair of front wheels of a vehicle, each wheel being positioned upon a respective one of the front wheelpans, and wherein an amount of each of the outputted forces is selected to influence lateral movement of each wheel via the respective front wheelpan.

2. The apparatus of claim 1, wherein each hydraulic cylinder is interconnected with one another such that lateral movement of a respective wheel of the pair of front wheels is decoupled from lateral movement of the vehicle including the pair of front wheels.

3. The apparatus of claim 1, further comprising a hydraulic line to facilitate fluid communication between hydraulic cylinders of one of the pair of lateral movement assemblies and hydraulic cylinders of the other of the pair of lateral movement assemblies, and further comprising a control valve operatively connected to the hydraulic line, in electrical communication with the sensor, and programmed to open responsive to receiving a signal from the sensor indicating detected lateral movement of one of the wheels of the pair of front wheels.

4. The apparatus of claim 3, wherein the sensor is mounted to one of the front wheelpans such that the sensor may detect lateral movement of one of the wheels of the pair of front wheels positioned in a predetermined region of the one of the front wheelpans.

5. The apparatus of claim 1, wherein each assembly of the pair of lateral movement assemblies further includes one or more retainers, each retainer of the one or more retainers mounted to one of the front wheelpans to retain one wheel of the pair of front wheels within a predetermined region while permitting rotation of the one wheel.

6. The apparatus of claim 1, wherein each of the hydraulic cylinders includes a first chamber and a second chamber, the first chambers being in fluid communication with one another and the second chambers being in fluid communication with one another, the fluid communication facilitating an interconnected relationship between the hydraulic cylinders.

7. A shaker rig for a vehicle comprising:
a pair of front support members constructed to support a front portion of a vehicle thereupon;
a pair of front movement assemblies, each front movement assembly of the pair of front movement assemblies mounted to a respective one of the pair of front support members, each front movement assembly including a front wheelpan mounted for a first lateral movement, and each front movement assembly further including a first hydraulic cylinder to direct the first lateral movement;
a pair of rear support members arranged with the pair of front support members constructed to support a rear portion of the vehicle thereupon, the vehicle defining a longitudinal axis oriented substantially perpendicular to a lateral axis defined by one of the front wheelpans; and
a pair of rear movement assemblies, each rear movement assembly of the pair of rear movement assemblies mounted to a respective one of the pair of rear support members, each rear movement assembly including a rear wheelpan mounted for a second lateral movement, and each rear movement assembly further including a second hydraulic cylinder to direct the second lateral movement,
wherein the front wheelpans and the rear wheelpans are arranged with the respective movement assembly to facilitate lateral movement of a respective wheelpan such that lateral movement of wheels of the vehicle resting upon the respective wheelpan is decoupled from movement of the vehicle.

8. The shaker rig of claim 7 further comprising:
a sensor mounted to one of the front wheelpans or one of the rear wheelpans;
a first hydraulic line fluidly connecting each of the first hydraulic cylinders to one another; and
a first control valve operatively connected to the first hydraulic line and in electrical communication with the sensor,
wherein the first control valve opens responsive to receipt of a signal from the sensor indicating a lateral movement of the wheel such that each of the first hydraulic cylinders outputs a fluid force in an amount selected to substantially maintain positions of the wheelpans relative to the longitudinal axis of the vehicle.

9. The shaker rig of claim 8 further comprising:
a second hydraulic line fluidly connecting the second hydraulic cylinders to one another; and a second control valve operatively connected to the second hydraulic line and in electrical communication with the sensor,
wherein the second hydraulic line and the second control valve are arranged with one another to interconnect the second hydraulic cylinders such that each of the wheelpans influence lateral movement of each of the wheels resting thereupon independent of movement of the vehicle.

10. The shaker rig of claim 9, wherein one of the first control valve and the second control valve is an active valve programmed to facilitate real-time control of fluid flow as directed by the hydraulic cylinders.

11. The shaker rig of claim 9, wherein one of the first control valve and the second control valve is accessible by a user for manual input.

12. The shaker rig of claim 7 further comprising a sensor mounted to one of the front wheelpans or one of the rear wheelpans at a location adjacent a region that receives a portion of one of the wheels of the vehicle.

13. The shaker rig of claim 7, wherein each of the front movement assemblies and each of the rear movement assemblies further includes one or more retainers, each retainer of the one or more retainers mounted to one of the wheelpans to retain a respective wheel within a predetermined region while permitting rotation of the respective wheel.

14. A lateral translation assembly for a vehicle test apparatus comprising:
a pair of front support shafts;
a pair of wheelpans, each wheelpan of the pair of wheelpans mounted to a respective one of the pair of front support shafts to support a respective front wheel of a vehicle, wherein the respective front wheel is adapted to directly contact the respective wheelpan, and lateral movement of the respective front wheel induces lateral movement of the respective wheelpan;
a sensor mounted to one wheelpan of the pair of wheelpans to detect lateral movement of the front wheel caused by vehicle dynamics during a vehicle test; and
a pair of lateral movement assemblies, each lateral movement assembly of the pair of lateral movement assemblies being engaged between a respective one of the pair of wheelpans and a respective one of the pair of front support shafts and arranged to direct lateral movement of the respective wheelpan based on a signal received from the sensor indicating the lateral movement of the front wheel is influencing a bind-up scenario for a vehicle suspension assembly operatively connected to the front wheel.

15. The assembly of claim 14, wherein each lateral movement assembly of the pair of lateral movement assemblied includes a hydraulic cylinder, each of the hydraulic cylinders being arranged with one another to facilitate an interconnecting relationship therebetween such that lateral movement of the front wheel is independent of movement of a vehicle including the front wheel.

16. The assembly of claim 14 further comprising:
a pair of rear support shafts;
a pair of second wheelpans, each wheelpan of the pair of second wheelpans mounted to a respective one of the pair of rear support shafts to support a respective rear wheel; and
a pair of second mechanisms, each mechanism of the pair of second mechanisms being arranged to direct lateral movement of a respective wheelpan based on a second signal received from the sensor,
wherein each mechanism of the pair of mechanisms and each mechanism of the pair of second mechanisms include a hydraulic cylinder, two of the hydraulic cylinders are interconnected with one another to facilitate an interconnecting relationship such that lateral movement of the rear wheel is independent of movement of a vehicle including the rear wheel.

17. The assembly of claim 16 further comprising:
a first hydraulic line facilitating a first fluid communication between the hydraulic cylinder mounted to one of the wheelpans and the hydraulic cylinder mounted to the other of the wheelpans; and
a control valve operatively connected to the first hydraulic line such that when in a first position synchronous movement of the wheels resting upon respective wheelpans is prevented.

18. The assembly of claim 17, wherein the control valve is an active valve programmed to facilitate real-time control of fluid flow as directed by the cylinders.

19. The assembly of claim 17, wherein the control valve is accessible by a user to manually adjust the control valve.

* * * * *